Figure 8:
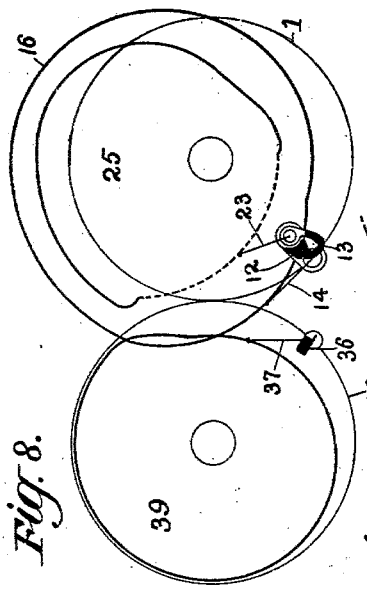
Figure 9:
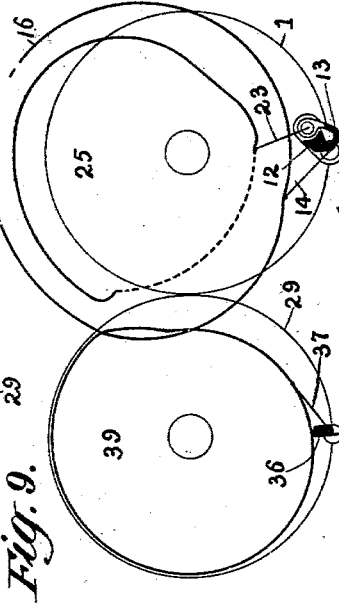
Figure 10:
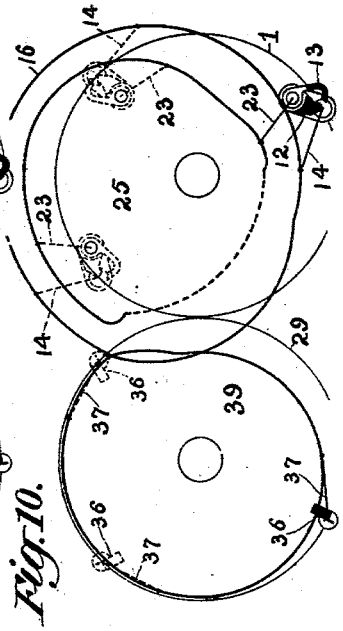
Figure 5:
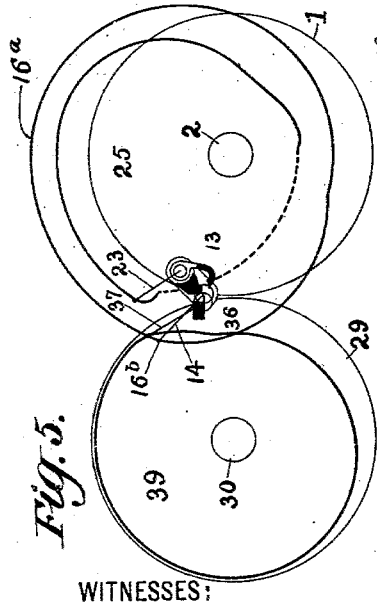

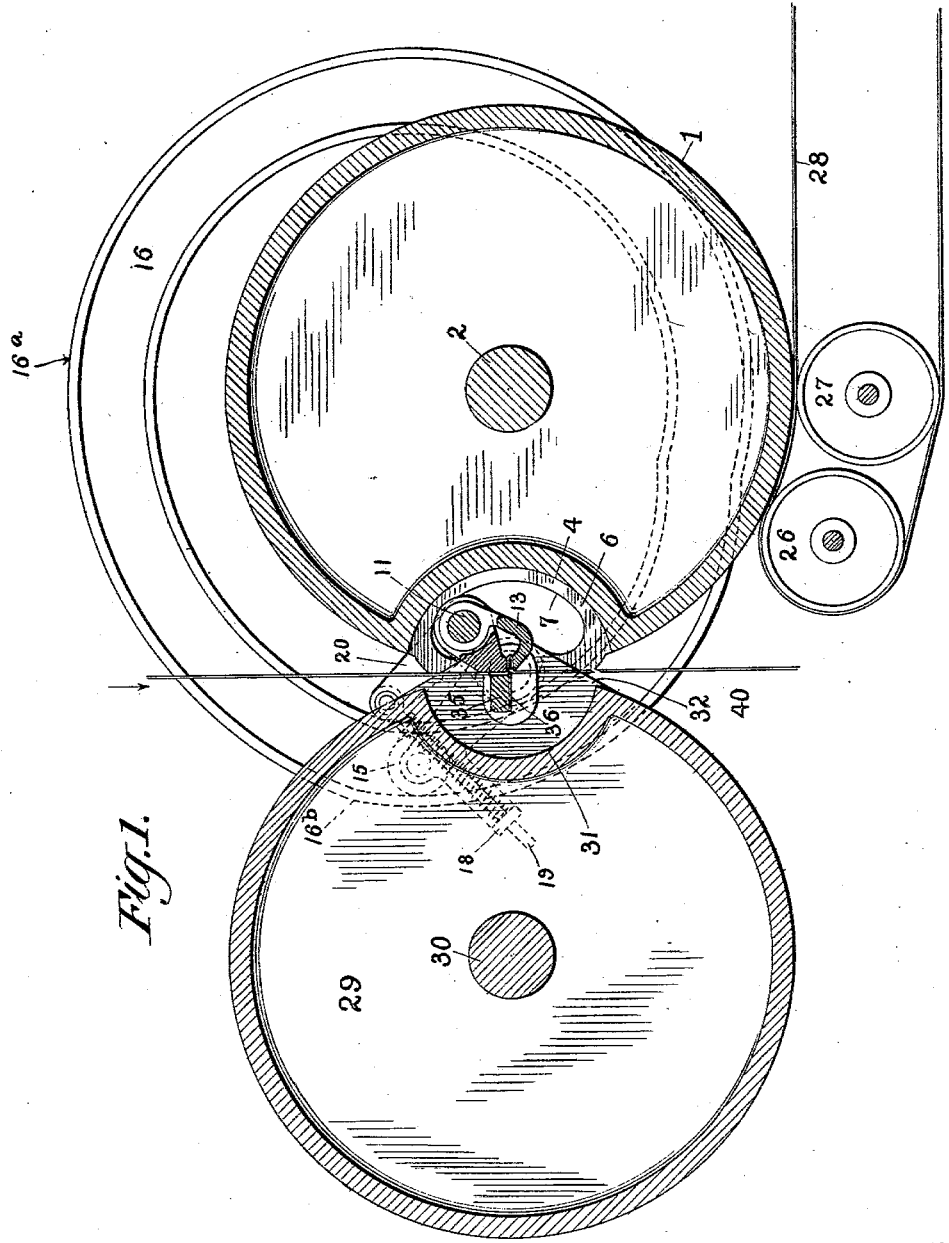

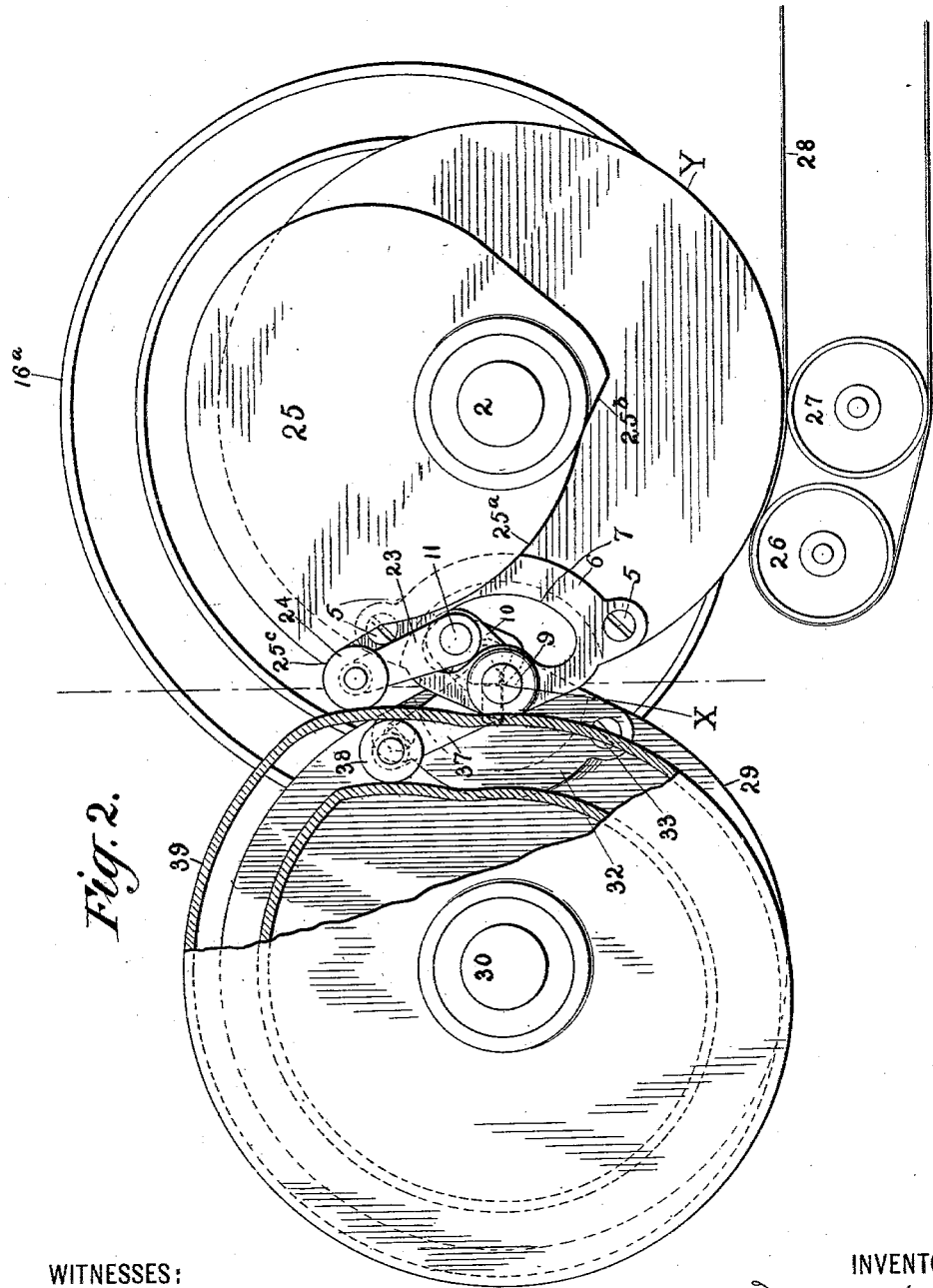

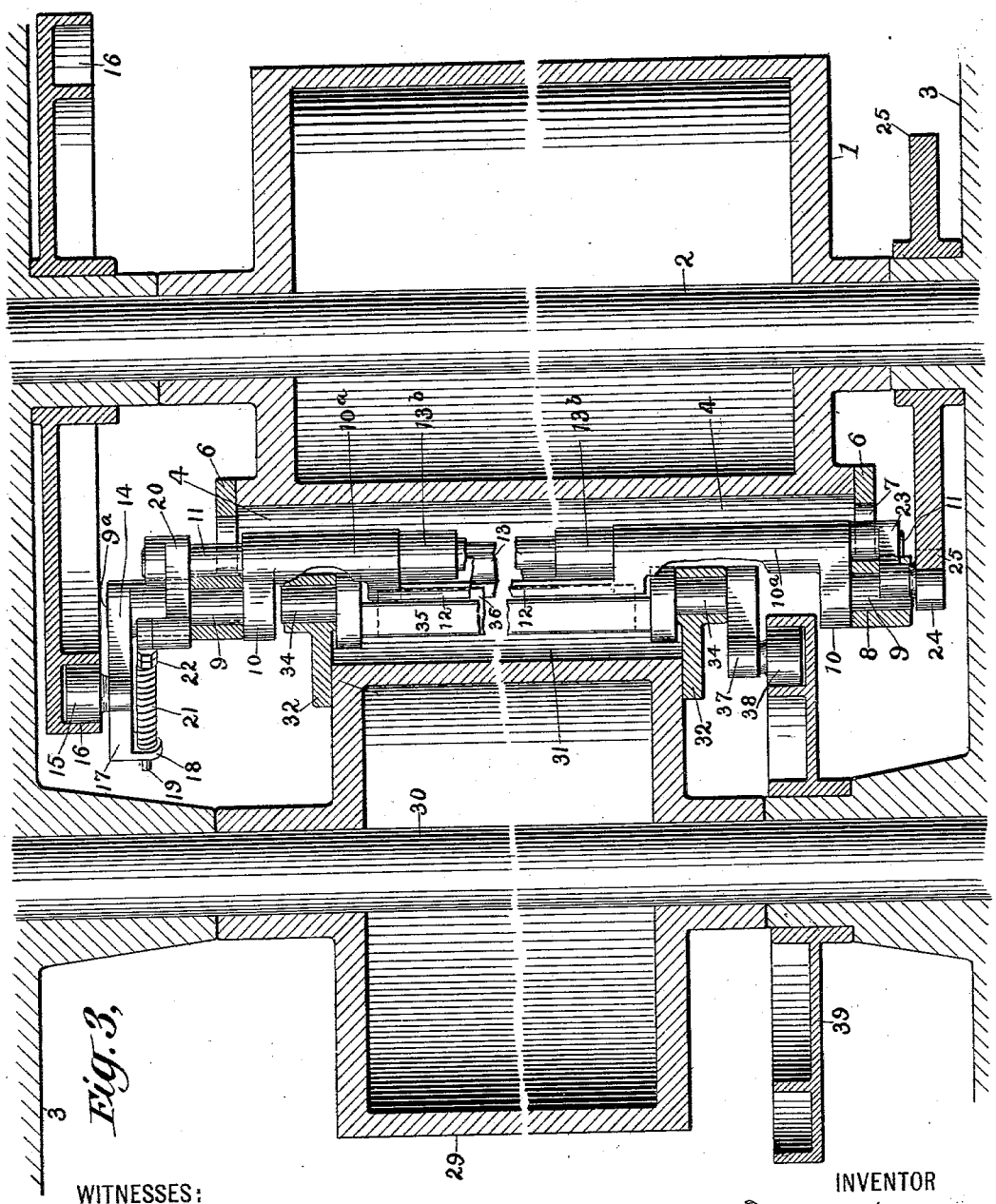

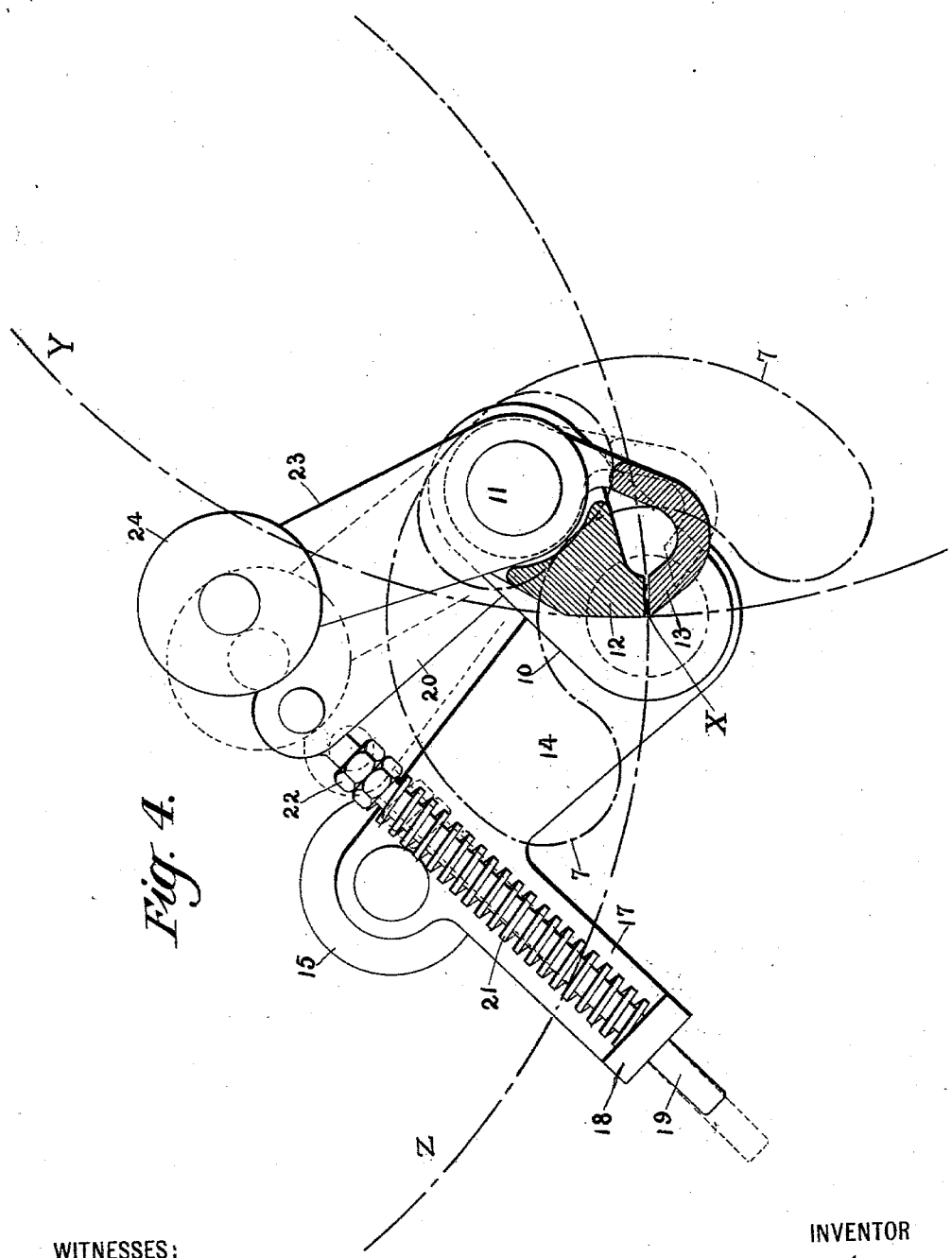

No. 629,928. Patented Aug. 1, 1899.
R. C. SEYMOUR.
FOLDING MACHINE.
(Application filed Feb. 2, 1899.)

(No Model.) 6 Sheets—Sheet 5.

WITNESSES:
D. N. Hayward
K. V. Donovan

INVENTOR
Ralph C. Seymour
BY Jacob Felbel
ATTORNEY

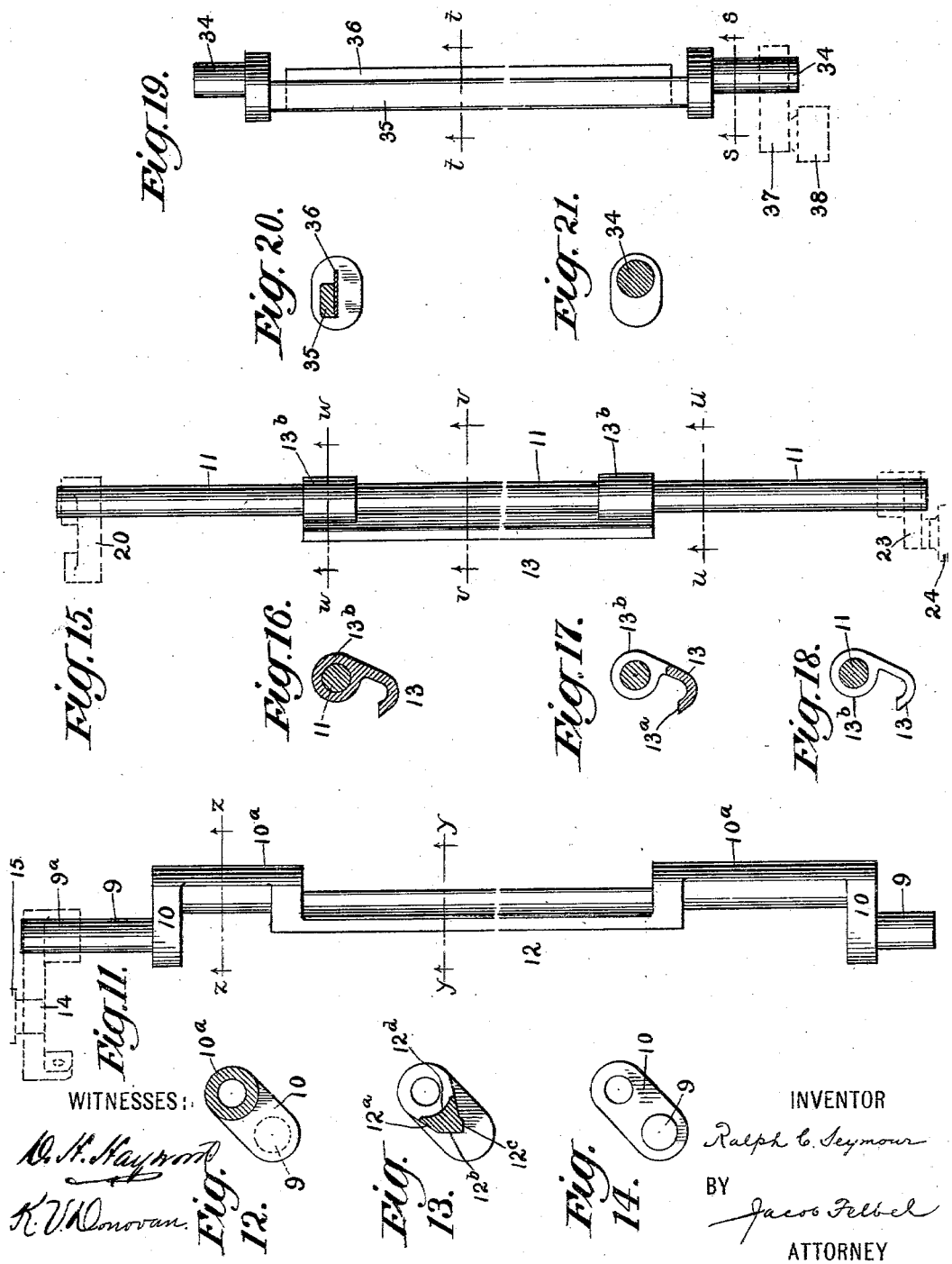

UNITED STATES PATENT OFFICE.

RALPH C. SEYMOUR, OF NEW YORK, N. Y., ASSIGNOR TO THE C. B. COTTRELL & SONS COMPANY, OF SAME PLACE, JERSEY CITY, NEW JERSEY, AND STONINGTON, CONNECTICUT.

FOLDING-MACHINE.

SPECIFICATION forming part of Letters Patent No. 629,928, dated August 1, 1899.

Application filed February 2, 1899. Serial No. 704,292. (No model.)

*To all whom it may concern:*

Be it known that I, RALPH C. SEYMOUR, a citizen of the United States, and a resident of the borough of Manhattan, in the city of New York, in the county of New York and State of New York, have invented certain new and useful Improvements in Folding-Machines, of which the following is a specification.

One object of my invention is to provide means for folding or doubling a sheet into the grasp of a suitable gripper or holding mechanism mounted upon a rotating cylinder or carrier and to maintain the fold in such position during a part of the rotation of the cylinder or carrier as that it will eventually come into alinement with the body portions of the folded sheet without any extra crease or bend, and another object is to provide a construction by which the fold may be made radially or substantially radially of the folding-cylinder and delivered tangentially or substantially tangentially of said cylinder, whereby the sheet after being folded once on said cylinder may be released therefrom and be carried or taken off while its head or folded edge is advancing for final delivery or for delivery to some other folding or carrying mechanism in lieu of being removed from said cylinder by means of a cross-folding mechanism operating at about the middle of the sheet while on the cylinder, whereby the once-folded sheet is again folded before it entirely leaves said cylinder, thus causing the halves of the sheet to move in opposite directions, which is objectionable.

Further objects of my invention will appear hereinafter in connection with the detail description of the mechanism and its mode of operation.

My invention consists in the various features of construction and combinations of devices hereinafter more fully described, and particularly pointed out in the appended claims.

In the accompanying drawings, Figure 1 is a central cross-section of a part of a folding-machine embodying certain features of my invention. Fig. 2 is an end elevation of the same and showing additional features, the framework of the machine and part of one of the cams of the knife-cylinder being broken away to more fully show the construction and arrangement of the parts. Fig. 3 is a central horizontal section of the machine with certain parts broken away to show features of construction and also to condense the view. Fig. 4 is an enlarged diagrammatic detail view of the gripper mechanism and illustrating some of its movements. Figs. 5, 6, 7, 8, 9, and 10 are diagrams illustrating the relative movements of the various parts. Fig. 11 is a top plan view of one of the jaws of the gripper mechanism, with its actuating-arm shown in dotted lines. Fig. 12 is a vertical cross-section taken at the line $z\,z$ of Fig. 11. Fig. 13 is a similar section taken at the line $y\,y$ of Fig. 11. Fig. 14 is an end view of the gripper-jaw shown at Fig. 11. Fig. 15 is a plan view of another one of the gripping-jaws and showing its actuating-arms in dotted lines. Fig. 16 is a vertical cross-section taken at the line $w\,w$ of Fig. 15. Fig. 17 is a similar cross-section taken at the line $v\,v$ of Fig. 15. Fig. 18 is a vertical cross-section taken at the line $u\,u$ of Fig. 15. Fig. 19 is a plan view of the folding blade or knife and its support, with its actuating-arm shown in dotted lines. Fig. 20 is a vertical cross-section thereof, taken at the line $t\,t$; and Fig. 21 is a similar section taken at the line $s\,s$.

In the various views the same parts will be found designated by the same letters and numerals of reference.

1 is the gripper-cylinder, mounted upon a shaft 2, suitably supported in the side frames 3 and rotated in any desired manner. On one side said cylinder is formed or provided with a deep arc-shaped or segmental groove 4, extending longitudinally of the cylinder and for its whole length. At each end of the cylinder in line with said groove is attached, by means of screws 5, a bracket or bearing-plate 6, formed or provided with an arc-shaped or segmental slot 7, which is formed about the axis X as a center and which axis lies in or coincides with the peripheral line Y of the cylinder 1.

At the front side of each bracket or bearing-plate 6 is a hole or bearing 8, which receives a journal or trunnion 9, extending laterally and horizontally from an arm 10, which extends obliquely upward. The parallelly-arranged arms 10 project into the groove 4 in the cylinder and support therein in eyes or bearings 10ª, formed at the upper ends of said arms, a cross-shaft 11, which at each end extends out through the slot 7 and past or beyond the side plate 6 for a purpose presently to be explained.

Between the tubular bearings 10ª and joining them so as to form one rigid structure is a part 12, that constitutes one of the jaws of the fold-gripping mechanism. The other jaw 13 of the gripper mechanism is secured upon the shaft 11. Both jaws 12 and 13 are adapted to swing together about the axis X (or about the trunnions 9) during the first quarter of the revolution of the cylinder 1, and the jaw 13 is adapted to swing independently of the jaw 12 for the purpose of clamping the fold of the sheet and for releasing the same at the proper time, as will hereinafter be more fully explained.

The gripping-jaw 12 comprises a continuous bar of a length suitable for the width of the sheet to be operated upon, and by preference this bar is made of the shape shown in cross-section at Fig. 13—that is to say, with a beveled top or head 12ª, a vertical nose 12ᵇ, a horizontal jaw portion 12ᶜ, and a curved or arc-shaped back 12ᵈ; but of course I do not wish to limit myself to this form or construction of gripper-jaw. The independently-movable gripper-jaw 13 also comprises a longitudinally-extended bar of suitable length and preferably of the cross-section shown at Fig 17, which is curved or hook-like and terminates in the horizontal jaw portion 13ª to match and coöperate with the jaw portion 12ᶜ of the companion member. Formed integral with the ends of the curved bar portion of the jaw 13 are the circular eyes or bearings 13ᵇ, which feed in between the bearings 10ª of the member 12 and which may turn independently of the latter when the shaft 11 is rocked by reason of the curved back portion 12ᵈ of the jaw 12; but likewise the jaw 13 may be otherwise formed or constructed.

One of the trunnions 9 (that farthest from the observer in the drawings and which may be designated as the "rear" trunnion) is elongated, as at 9ª, and attached to this portion of the trunnion is an arm 14, that carries an antifriction-roller 15, which engages with a stationary grooved cam 16, supported on the framework and which controls the movement of the gripper mechanism as a whole, as will presently be seen. The crank-arm 14 is provided with a lateral extension 17, that carries a lug 18, which is perforated for the passage of a rod 19, that is carried by a crank-arm 20, secured to the shaft 11 at its rear end. Upon the rod 19 is a coiled spring 21, which bears at one end against the lug 18 and at its opposite end against adjusting-nuts 22 on said rod. Normally the spring is in compression, and hence its action is to force the two arms 14 and 20 apart and therefore to close the jaws 12 and 13, constituting the grippers.

The shaft 11 is provided at its front end with another crank-arm 23, which carries an antifriction-roller 24, that engages with a stationary face-cam 25, attached to the framework, the said crank-arm 23 and the said cam 25 being adapted to rock the shaft 11 for the purpose of swinging the jaw 13 away from the relatively-fixed jaw 12, so as to open the grippers.

Figure 6:
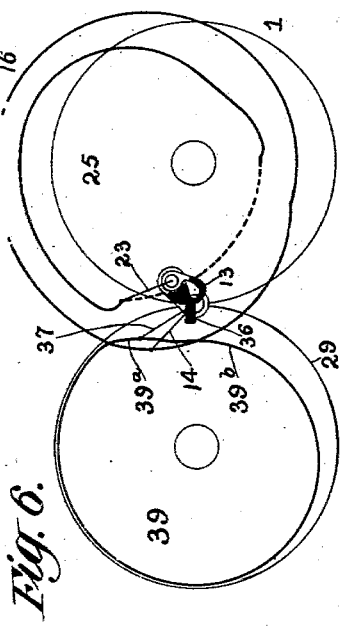

Referring more particularly to Fig. 4, the grippers are shown with relation to the peripheral line Y of the gripper-cylinder as being in such position that a horizontal line will pass through the axis of motion X of the grippers and through the axis 2 of the gripper-cylinder. Fig. 6 also shows this relation of the parts. It is desirable to maintain the grippers in such horizontal position until the axis X is in a vertical line passing through the axis 2 of the gripper-cylinder or to about this line. The grippers will then be in such relative position to the gripper-cylinder as is shown by the dotted line Z at Fig. 4 or as more fully shown in Fig. 9. The line Z represents the lower section of the cylinder when the grippers are in the vertical line of the axis of the cylinder, as in Fig. 9. The gripper-cylinder has during this time made one-quarter of a revolution about its axis and during this movement the cam 16 has revolved the gripper mechanism as a whole through the medium of the crank-arm 14 and its antifriction-roller 15 one-quarter of a revolution about the axis X of the gripper mechanism, which, as before stated, is on the peripheral line of the gripper-cylinder. In other words, while the gripper-cylinder is making a quarter of a turn the gripper-jaws 12 and 13 are in a closed condition and are independently rotated about the axis X, which is permitted by the groove 4 in the gripper-cylinder, the ends of the shaft 11 swinging around from the upper to the lower ends of the slots 7 in the bearing-plates 6. The grippers thus have a sort of planetary movement around with the cylinder for the first quarter of its revolution, the relative rotation of each in opposite directions having a negative effect and the grippers moving through an arc of ninety (90°) degrees, but maintaining always a horizontal position. The purpose of this is to avoid the making of a second bend or fold in the sheet in the grasp of the grippers, and which would be the case were the grippers fixed relatively to the cylinder and carried around immovably thereby. In other words, the construction above described permits a sheet of paper to be tucked into the nipping-jaws or grippers, with the crease or fold at right angles to the path of travel of the sheet, and as the cylinder rotates to be held with the creased or folded part constantly in a horizontal position, so that when the point of delivery of the sheet is reached the creased portion may be in line with the body portion of the sheet instead of at an angle thereto, as in prior constructions and which is very objectionable. The creased or folded portion of the sheet is preferably at the time of delivery at or approximately at a tangent to the gripper-cylinder, depending upon where the axis X of the gripper-jaws is situated. I prefer to have this axis coincident with the peripheral line of the cylinder; but it may be offset therefrom without departing from the principle of my invention.

The folded sheet may be released at or to any desired form or construction of delivery mechanism—as, for example, a mechanism comprising rolls 26 27 and carrying-tapes 28—which may conduct the once-folded sheet either to a table, box, or other desired receptacle, or to another folding mehanism of any desired construction for further folding the sheet or sheets. The gripper-cylinder may also be provided with the usual holding and carrying tapes.

The folded sheet in the grasp of the grippers is released at the delivery mechanism, which, as shown, is preferably located on the under side of the gripper-cylinder and at a point about one-quarter way around from where the sheet is taken by the grippers. The releasement of the sheet at the delivery mechanism is effected by the stationary cam 25 acting on the crank-roller 23 through the antifriction-roller 24. The cam is so shaped as that at the proper time it will vibrate the arm 23 and cause the shaft 11 to rock against the pressure of the spring 21, and thus cause the lower or relatively movable swinging jaw 13 to vibrate away from the relatively stationary holding-jaw 12, whereby the folded sheet may pass off along the tapes 28 at about a tangent to the gripper-cylinder and in a smooth and even condition without superfluous bends or folds.

The cam 25 does not affect the grippers as a whole—that is to say, it does not rotate them about their common axis X. It merely forces the relatively movable part to release the folded sheet. During the time the fold is gripped between the jaws the cam 25 is inactive, being cut away, as shown at $25^a$, thus enabling the spring to keep the jaws together or closed until the proper time, as until the roller on the arm 23 has reached the rise $25^b$ of the cam, when the jaw 13 is acted upon and opened, as before explained.

During the remainder of the rotation of the gripper-cylinder the grippers have to be returned to their normal position relatively to the cylinder, and this is accomplished by the arm 14 and its stationary cam 16. In other words, the grippers have to be rotated about their common axis X one-quarter of a revolution in the opposite direction to that previously made, and when this quarter of a revolution has been effected the grippers are maintained in their normal position until they come around again to the proper position to receive another sheet or to the position shown at Fig. 5. During this time the cam 25, which acts on the relatively movable gripper 13, merely holds said gripper in its open position and allows it to follow around with the relatively stationary gripper. The grippers are brought to their normal positions at about the point marked $16^a$, from which point the grooved cam is made with a dwell or concentric portion to the point $16^b$, so that no further effect may be had upon the grippers until the roller 15 on the arm 14 reaches the point $16^b$, at which time the grippers are ready to receive a sheet and from which point the grippers commence to revolve together about the axis X after the roller on the arm 23 has passed off of the high part $25^c$ of the cam 25 to cause the jaw 13 to close.

Before describing further the operation of the fold gripping and carrying mechanism I will now first describe the construction and general operation of the tucking-blade or folding-knife and its mode of mounting.

29 is a drum or cylinder mounted to turn with a shaft or axle 30, driven in any suitable way and in unison with the gripper-cylinder 1. On the knife-cylinder is formed or provided a longitudinal groove or depression 31, curved or arc-shaped in end view, and at each end of the cylinder is provided a bearing-plate or bracket 32, secured by screws 33 and provided with a hole to act as a bearing for a trunnion or pintle 34, extending laterally from each end of a longitudinally-arranged knife-support 35, made in the form of a bar and provided on its under side with a tucking-knife 36, adapted to double or fold the sheet into the bite of the jaws 12 and 13 when open. The pintles 34 are preferably arranged in the peripheral line of the knife-cylinder, and the forward or front pintle is prolonged and provided with a crank-arm 37, which bears a roller 38, that travels in a grooved cam 39, fixed on the framework of the machine. This cam is so shaped as to bring the knife or blade 36 to a horizontal or radial position when the parts are substantially in the positions shown at Fig. 5 of the drawings, which is the moment at which the knife is about to force the paper into the bite of the grippers. The cam 39 is also so shaped as to keep the knife in a horizontal position while it is moving in between the grippers and also while it is moving out from between them, whereby a more accurate and better fold may be made and with less liability of the receding knife withdrawing the paper from between the grippers. The cam is so shaped that after the recession of the knife, as just explained, the knife is gradually brought back slightly past a radial position and to the position which it should occupy to start the fold. (See Fig. 5.)

Figure 7:
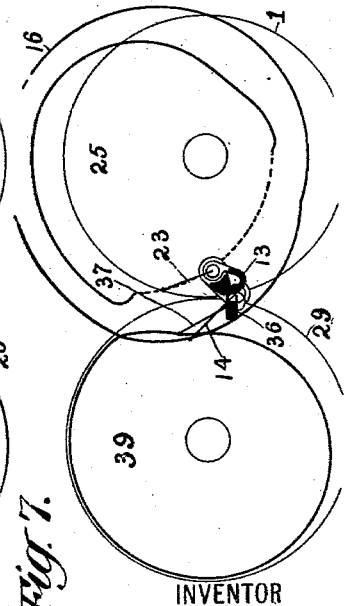

While the roller 38 on the arm 37 is traveling along the depressed part $39^a$ of the cam 39, the knife-support is rocked on its pivots in a direction opposite to that of the rotation of the cylinder 29, and hence the knife is maintained at this time in the desired horizontal position and which position continues until the said roller commences to travel along the gradually-rising portion 39$^b$ of the cam, when the said knife then begins to move around to a position slightly past the radial and to substantially the position shown at Fig. 7; but this is not essential so long as the knife is actuated and controlled in a manner such that it shall continue to keep a horizontal position while engaging with and disengaging from the gripping-jaws while they are in a horizontal position during the folding or doubling operation, as explained. The grippers are preferably kept in a horizontal position for about one-quarter of a revolution of their cylinder, so as to avoid bending or creasing the sheet, as before described, while the knife need only be kept in a horizontal position until it has worked away from or parted company with the grippers. At about the time or an instant before the parts have arrived at the positions shown at Fig. 5 a sheet of paper 40 has come down between the cylinders, and the knife is about to start to tuck the sheet into the grippers and make a fold, so as to double the sheet. After the knife has tucked the sheet in between the grippers the arm 23 is released or passes off the high part 25$^c$ of the cam and the spring 21 causes the jaw 13 to snap up against the relatively-fixed jaw or abutment 12 and clamp or hold the doubled portion of the sheet. As the cylinders continue to revolve the knife will be caused gradually to withdraw from between the gripper-jaws, by reason of the traveling of the roller of the arm 37 on the part 39$^a$ of the cam 39, until the knife has completely cleared the grippers, as shown at Fig. 7, and left the doubled sheet in the bite of said grippers, the sheet being omitted from the diagrammatic views for the sake of clearness. During all this time — that is, while the grippers and the knife are traveling from the positions shown at Fig. 5 to those shown at Fig. 7—the grippers and the knife or blade are held in horizontal positions. The cam 39 through the roller 38 and arm 37 now gradually returns the knife and its support slightly past a radial position relatively to the axis of the knife-cylinder; but the grippers, as before explained, continue to remain in a horizontal position and closed by the action of the spring until they arrive at the position shown at Fig. 9. While the grippers have traveled from the position shown at Fig. 6 to that shown at Fig. 9, the cam 25 has had no effect upon the arm 23, the dotted lines in these figures showing simply the line of travel of the center of the antifriction-roller on the arm 23. At the point 25$^b$, however, the cam 25 again takes up or acts on the arm 23 and the relatively movable jaw is forced open against the tension of the spring 21 and the sheet is released to the delivery mechanism. During the remainder of the revolution of the gripper-cylinder the grippers are rotated about the axis X in a reverse direction and then are maintained in proper position to receive another sheet when they arrive at the position shown at Fig. 5 and coöperate with the tucking-knife. At Fig. 10 the movable jaw 13 is shown in full lines as having been opened and by the dotted lines as being kept open for the remainder of the revolution of the cylinder. This view also shows that after the movable jaw 13 has been opened the arm 14 begins to travel on the gradually-rising portion of the cam 16, whereby the grippers as an entirety are caused to rock about their common axis X and gradually to be turned one-quarter around in the direction of the revolution of the cylinder, whereby they are caused to regain the motion lost in traveling in a horizontal position for the first quarter of the revolution of the cylinder, and thus be brought to the proper position relatively to the said cylinder to again coöperate with the folding-knife. At Fig. 10 the grippers and their arms are shown in dotted lines in the positions which they occupy during the completion of the revolution of the cylinder and while the grippers are being turned together about the axis X to bring them again into operative position to receive another sheet. The gripper-cylinder and the knife-cylinder in this instance, but not necessarily, have the same diameter, and the axis X or the trunnions 9 are preferably in the peripheral line of the gripper-cylinder, and the axis or pivot 34 of the tucking-knife is preferably in the peripheral line of the knife-cylinder. The axes of said cylinders are preferably in the same horizontal line and their peripheries run tangent to each other. Accordingly, while the grippers and the knife are traveling toward the horizontal line joining the axes of said cylinders they approach each other, and when the said horizontal line is reached the knife-blade is within the mouth of the gripper-jaws in a horizontal or radial position and the trunnions 9 and pintles 34 are coincident on said horizontal line, as shown at Fig. 6. As the grippers and the knife pass below said horizontal line their axes 9 and 34 gradually separate and the knife is withdrawn from the grippers, but while both the knife and the grippers remain in a horizontal position.

Referring to Fig. 1, I have illustrated two superposed sheets as having been delivered vertically to the folding cylinders or carriers and the fold as having been made. As the cylinders continue to rotate the lower halves of the sheets (whose middle portions are doubled or folded within the jaws of the nippers) continue to descend and also to glance toward the roller 26, while the upper halves approach the surface of the cylinder above the nipping-jaws. Soon the lower halves are carried along over the upper portion of the roller 26, while the upper halves are carried toward said roller, and in consequence the upper and lower halves of the sheets approach each other and are caused to be laid one on top of the other or arranged in parallelism at or by the time the upper and lower portions are drawn between the roller 26 and the cylinder 1, during all of which time the grippers have kept the folded or doubled central portion of the sheets in their grasp and in a horizontal position; but at or about the time the body portions of the sheets have been doubled or brought face to face, as described, and at which time the central doubled or folded portion lies substantially in the plane of the body portions of the folded or doubled halves the gripping-jaws release the sheets, so that they may be taken away from the surface of the carrying-cylinder. It will thus be seen that by keeping the doubled or centrally-folded portion of the sheet or sheets moving successively in parallel planes while the cylinder is rotating and while in the embrace of the nipping-jaws I am enabled eventually to bring the doubled or folded edge in the grasp of the grippers and the doubled or superposed body portions of the sheet in line with each other or in substantially the same plane without putting a crease or fold line in the body of the paper between its free edges and the central crease or fold line at the opposite edge of the paper, and hence the folded sheets may be delivered with that portion which was in the grasp of the grippers in a flat or horizontal condition and in line substantially with the body portion or remainder of the sheet and also while in a position tangent to the cylinder, or practically so.

In the prior constructions the central doubled or folded portion which was in the grasp of the grippers received a fold or crease line along the outer edge of the grippers, and this portion when released stood at substantially a right angle to the body portion of the sheet, and hence made it difficult to deliver or carry off the folded product or to pass it along to other folding devices.

While I have designed the present machine so that the grippers will carry the folded or doubled edge in a substantially horizontal position until the time of releasement thereof, it will be understood that there may be some slight deviation from an exact horizontal carrying position of this doubled portion without departing from the spirit of my invention, for while the best results may be obtained by arranging the mechanism to operate as herein shown and described it may be possible to produce satisfactory results by carrying the doubled portion at a slight angle to the horizontal, and it will also be understood that while I prefer to carry the said doubled portion from the time that it is left in the grasp of the grippers until the time that it is released therefrom in successive parallel planes the said doubled portion while in the mouth of the grippers may be otherwise carried and kept in a position such that there will be no intermediate crease or fold line formed in the doubled paper and in a position such that at or about the time of releasement of the doubled portion by the grippers it will be in or substantially in the line of the body of the folded sheet instead of at a right or other sharp angle thereto.

When the paper or sheet to be doubled is passed down vertically between the cylinders, the mouth of the gripping-jaws and the doubled portion of the sheet therebetween in the example shown are carried in horizontal positions until the opening of the grippers to release the folded sheet; but it will be understood, of course, that the sheet to be folded may be fed in between the knife and gripper cylinders while running in a horizontal direction, in which case the mouth of the grippers or their clamping-faces and the doubled portion of the sheet between them will stand in vertical positions during the first part of a revolution of the gripper-cylinder and until the grippers are caused to release the folded sheet, which in this case they would do when the doubled edge and the body of the sheet are in line in a vertical plane or in substantially such plane. If the sheet containing Fig. 1 of the drawings be turned one-quarter way around, so that the knife-cylinder stands above the gripper-cylinder, an illustration may then be had of the last-described modification of my improvement—that is to say, in this case the paper will appear as being fed in horizontally, while the mouth of the grippers and the fold therein are pointing vertically—and by reference to the diagrams Figs. 5 to 10, if they be held in a position to correspond with that in which Fig. 1 is now turned it will be seen that this vertical position of the mouth of the grippers and of the doubled edge therein are maintained until the cylinder has made about one-quarter of a revolution (preferably a little more) or until the time the jaws are opened and release the fully doubled or folded sheet, with all parts thereof in substantial alinement.

The gripper mechanism preferably carries the folded portion of the sheet about one-quarter of a revolution in a direction opposite to the direction of motion of the cylinder (or backwardly) or until the mouth or opposing faces of the nipping-jaws become tangent, or substantially so, to the surface of the cylinder. The said jaws may be carried thus at a tangent to the cylinder for any desired length of time after the said first quarter of a revolution of the cylinder has been passed, and the folded sheet or sheets may be delivered at any suitable point while the jaws are in said tangent position. For instance, the delivery may be effected at a point diametrically opposite the place where the fold is made, thus carrying the fold through an arc of one hundred and eighty (180°) degrees, or the fold may be liberated either before or after this point has been reached. The delivery of the sheet is always made preferably tangent to the cylinder, and the fold is always best made radially of the cylinder. In the machine shown the fold is made radially and delivered tangentially, and in so far as the main features of my invention are concerned the fold may be turned to the tangent position during any desired part of the revolution of the cylinder. It may be turned thus during the first ten (10°) degrees, say, of the revolution of said cylinder, but the longer the time or space occupied in the turning the better, because the motion can be made easier, although the delivery may be effected at some point farther away. Practically it is best to turn the fold to the tangent position during about ninety (90°) degrees of the revolution of the cylinder, particularly if a cam be employed for turning the gripper mechanism and the fold.

Any suitable construction or arrangement of guides or analogous devices may be employed to deflect, control, or guide the loose or free ends of the sheets as the doubled edge is being carried around to the point of releasement or to the delivery mechanism.

It will be seen from the foregoing that I have provided a mechanism by which a sheet is folded into a cylinder at a suitable angle to the direction of feed or introduction of said sheet and a mechanism by which the angle of the fold is changed as the cylinder rotates and until the fold arrives at a point suitable for the removal of the sheet from the cylinder, and also that I have provided means for taking the folded sheet at right angles to its path of travel and substantially radially of the folding-cylinder and means for floating or turning the fold toward a tangent position during the forward carrying movement of the cylinder.

The sheet to be folded may be a detached sheet fed either by hand or by any suitable mechanism to the folding-cylinder, or it may be a part of a web of paper proceeding from a suitable printing-machine and in which suitable mechanism is provided for detaching a sheet at the proper time in order that it may be carried around with the folding-cylinder. Therefore in the use of the term "sheet" I wish to be understood as including any and all known forms of sheet, whether detached or forming part of a web of paper subsequently to be detached into sheets.

Although I prefer to employ, in combination with the gripping-jaws of the folding-cylinder, the peculiarly-operating folding-blade hereinbefore described, because I find that the best results may be obtained therefrom, nevertheless in so far as the main feature of my invention is concerned I do not wish to be limited, unless otherwise stated, to the said folding-blade, and in so far as the improvement in the mode of mounting and operating the folding-blade is concerned it will be understood that gripping or nipping jaws of other construction and modes of operation than those shown on the folding-cylinder may be employed in connection with said folding-blade.

Of course it is evident that very many changes in details of construction and arrangement and means for operating the parts, as well as the shapes or forms of some of the parts, may be made without departing from the spirit of my invention.

The cylinders or carriers may be made full and complete, as shown, or they may be made as skeleton cylinders or of only segments of cylinders, and hence in the concluding claims where the terms "cylinders" and "carriers" are employed I do not wish to be understood as limiting myself to a full or complete cylinder, but as including what is above indicated, as well as any rotatory devices adapted to support and carry the grippers and the folding-blade.

It will be understood, of course, that two or more sets of grippers may be used on the folding cylinder, carrier, or device and that one or more folding-blades may be used on the knife or blade cylinder, carrier, or device.

What I claim as new, and desire to secure by Letters Patent, is—

1. In a folding-machine, a cylinder provided with a pair of gripping-jaws which carry the fold of the sheet and turn it relatively to the periphery of the cylinder.

2. In a folding-machine, a cylinder having a pair of coacting gripping-jaws which are mounted to have a movement independently of said cylinder when the latter is rotating and turn the folded edge of the sheet relatively to the periphery of the cylinder.

3. In a folding-machine in combination with a radially-acting folding-blade, of a cylinder having a pair of coacting gripping-jaws, both of which are mounted to have a movement together independently of said cylinder, and one of which jaws is mounted to have a movement independently of the other jaw.

4. In a folding-machine, a cylinder provided with a pair of gripping-jaws which have a common axis of motion and one of which jaws has a separate axis of motion in combination with means for turning said jaws together and turning the mouth of said jaws from a substantially radial to a substantially tangential position relatively to the surface of the cylinder, and means for opening and closing the jaw that has a separate axis of motion so as to grip and release the folded edge of the sheet at the proper times.

5. In a folding-machine, the combination of a cylinder having a pair of gripping-jaws mounted to turn together independently of said cylinder, means for holding said jaws open, means for folding or doubling a sheet in between said open jaws, means for closing said jaws, means for turning said closed jaws independently of the cylinder and while the cylinder is carrying the folded edge of the sheet toward the delivery-point, and means for opening said jaws at the desired time to permit the delivery of said sheet.

6. In a folding-machine, the combination of a cylinder, a pair of gripping-jaws carried thereby and mounted for independent movement, means for folding or doubling a sheet into the bite of said jaws while their mouth stands in a substantially radial position with reference to the axis of the cylinder, means for turning said jaws toward a tangential position relatively to the surface of said cylinder while the said cylinder is carrying the folded sheet toward the delivery-point, and means for opening and closing the said grippers at the proper times.

7. In a folding-machine, the combination of a cylinder, a pair of gripping-jaws mounted thereon and for movement independently of said cylinder, a folding-blade adapted to double or fold the sheet into the bite of said jaws, and means for turning said jaws with the folded portion of the sheet backwardly, relatively to the forward movement of the cylinder and during such movement.

8. In a folding-machine, the combination of a cylinder, a pair of gripping-jaws having a common axis of motion on said cylinder, a folding-blade adapted to double or fold a sheet into the bite of said jaws, and means for turning said jaws about said axis during the forward movement of the cylinder and so as to cause the folded edge of the sheet to move in a direction toward a tangent to said cylinder.

9. In a folding-machine, the combination of a cylinder, a pair of gripping-jaws having a vibratory movement together on and independently of said cylinder, a folding-blade adapted to double or fold the sheet into the bite of said jaws at a suitable angle to the path of movement of the sheet, and means for turning said jaws so as to maintain constantly substantially the same position of the fold while it is being carried by the cylinder, whereby as the body portions of the sheet are brought face to face they come into alinement with the folded portion of the sheet.

10. In a folding-machine, the combination of a cylinder, a pair of gripping-jaws mounted thereon and to vibrate independently thereof, means for doubling or folding a sheet into the bite of said jaws in a direction substantially radial of the cylinder, and means for turning said jaws during the advance of the cylinder and in such manner that the folded portion is turned from the radial position and carried in substantially parallel planes to a position substantially tangential of said cylinder.

11. In a folding-machine, the combination of a cylinder having a pair of gripping-jaws, and a folding-blade that tucks or folds a sheet in between said jaws and in a direction substantially radial of said cylinder; the said jaws being adapted to turn and carry the folded portion of the sheet from the substantial radial position in substantial parallel planes to a position substantially tangential of the cylinder.

12. In a folding-machine, the combination of a cylinder, a pair of gripping-jaws having a common axis of motion and a folding-blade for tucking or folding a sheet in between said jaws when open and in a direction substantially radial of said cylinder, means for closing said jaws so as to clamp the folded portion of the sheet between them, and means for then turning both jaws about their common axis so as to bring the folded edge of the sheet to a position substantially tangential of said cylinder.

13. In a folding-machine, the combination of a cylinder, a pair of gripping-jaws having a common axis of motion and one of said jaws having an independent axis of motion, means for swinging the latter jaw toward and from said companion jaw at the proper times to receive and release the folded portion of the sheet, a folding-blade, and means for turning both gripping-jaws about their common axis of motion.

14. In a folding-machine, the combination of a cylinder, a pair of gripping-jaws adapted both to turn together independently of said cylinder and one jaw to turn independently of the other jaw, a folding-blade, and means for properly operating said jaws and blade.

15. In a folding-machine, the combination of a cylinder, a pair of gripping-jaws carried thereby and mounted to turn together independently thereof, and a folding-blade mounted in a separate carrier and adapted to turn with and independently of said carrier.

16. In a folding-machine, the combination of a cylinder carrying a pair of independently-pivoted gripping-jaws, a second cylinder carrying an independently-mounted folding-blade, and means for properly operating the said grippers and means for causing said folding-blade to double or fold a sheet into the bite of said jaws and for also causing the said folding-blade to travel in a succession of parallel planes and parallelly with the mouth of the gripping-jaws during the retraction of said blade from said mouth.

17. In a folding-machine, the combination of a cylinder provided with a pair of independently-mounted gripping-jaws, a second cylinder provided with an independently-mounted folding-blade, adapted to tuck or fold a sheet into the bite of said jaws, and means for turning said jaws and said blade backwardly relatively to their respective cylinders and in such manner that the mouth of the gripping-jaws and the folding-blade travel for a brief time in the same planes and while the said blade is being retracted from the mouth of the gripping-jaws.

18. In a folding-machine, the combination of a cylinder, a pair of gripping-jaws having a common axis thereon, and one of said jaws having an independent axis of motion, a second cylinder having a pivotally-mounted folding-blade adapted to tuck or fold a sheet in between said jaws when open and with the fold in a substantially radial position, means for swinging the independently-pivoted jaw so as to cause it to close upon the folded portion of the sheet, means for turning the pair of jaws about their common axis, and means for turning the folding-blade about its pivotal axis so that during the retraction of said blade it moves in a line parallel with said jaws.

19. In a folding-machine, the combination of a cylinder, a pair of gripping-jaws carried thereby, means for opening and closing said jaws, and for causing their mouth to turn from a substantially radial to a substantially tangential position relatively to said cylinder, a second cylinder, a folding-blade, and means for causing it to fold a sheet into the mouth of said jaws while said mouth is in a substantially radial position and for turning said blade in a direction toward a tangent to its cylinder while the said blade is being withdrawn from the mouth formed by the working faces of said gripping-jaws.

20. In a folding-machine, a cylinder provided with means for taking on the folded portion of a sheet in a substantially radial position and for turning said folded portion only to a substantially tangential position.

21. In a folding-machine, a cylinder provided with means for gripping the folded portion of a sheet in a substantially radial position and for turning said folded portion only to a substantially tangential position during the rotation of the cylinder.

22. In a folding-machine, the combination of a folding-blade mounted upon a suitable carrier, and a folding-cylinder provided with means to receive the folded portion of the sheet from the said blade in a substantially radial position and for turning said folded portion only so as to cause it to assume a substantially tangential position during the rotation of said folding-cylinder.

23. In a folding-machine, the combination of a folding-blade mounted upon a suitable carrier, fold-gripping means mounted upon a suitable carrier, means for causing the folding-blade to fold a sheet into said gripping means while the latter and the folding-blade are in substantially radial positions, means for turning the gripping means and folded portion out of the radial position and toward a tangential position, and means for turning the folding-blade out of a radial and in the direction of a tangential position.

24. In a folding-machine, the combination of a pair of cylinders, means for delivering a sheet between said cylinders and approximately at right angles to a line joining their axis of motion, a pair of pivotally-mounted gripping-jaws carried by one cylinder, a folding-blade carried by the other cylinder, and adapted to double a sheet into the bite of said folding-jaws in a direction at right angles to the delivery of said sheet, and means for maintaining the folded portion at right angles to the direction of introduction of the sheet as the cylinder advances so as eventually to bring the folded halves of the sheet together in condition to be delivered tangentially of the cylinder, and without forming an extra bend or crease in the sheet.

25. In a folding-machine, the combination of a pair of cylinders, means for feeding a sheet therebetween and in a direction at right angles to a line joining the axes of said cylinders, a pair of pivoted gripping-jaws on one of said cylinders, a pivoted folding-blade on the other of said cylinders and adapted to double a sheet into the bite of said gripping-jaws and in a direction at right angles to the path of travel of the sheet, means for retracting the said folding-blade in a direction at right angles to the path of introduction of said sheet, and means for maintaining the folded portion of the sheet constantly at right angles to the direction of introduction of the sheet until such folded portion has arrived substantially at a position tangential of said cylinder.

26. In a folding-machine, the combination of a folding-blade, a folding-cylinder, a pair of gripping-jaws having a common axis of motion which is coincident with the peripheral line of said cylinder, and means for turning said jaws together about said axis while the said cylinder advances with the fold in the bite of said jaws.

27. In a folding-machine, the combination of a folding-blade, a folding-cylinder, a pair of pivoted jaws having a common axis of motion which is situated on the peripheral line of said cylinder and one of said jaws having an independent axis of motion, whereby the jaws may be opened and closed and whereby the jaws may turn together independently of said cylinder so as to carry the folded portion of the sheet in substantially the manner hereinbefore described.

28. In a folding-machine, the combination of a folding-cylinder provided with a pair of gripping-jaws adapted to operate upon the folded portion of the sheet in substantially the manner hereinbefore described, a second cylinder, a folding-blade pivotally mounted in the periphery thereof and with its axis of motion arranged in the peripheral line of said cylinder, and means for turning said folding-blade reversely to said cylinder and from a substantially radial position in the direction of a tangential position during the rotation of said cylinder.

29. In a folding-machine, the combination of a cylinder, a pivoted folding-blade having its axis of motion arranged in the peripheral line of its cylinder, a folding-cylinder, a pair of gripping-jaws having a common axis of motion arranged in the peripheral line of said cylinder, and means for turning said folding-blade and the said gripping-jaws at the appropriate times and for the purposes substantially as hereinbefore described.

30. In a folding-machine, the combination of a cylinder, a pivoted folding-blade having its axis of motion arranged in the peripheral line of the cylinder, a folding-cylinder, a pair of gripping-jaws having a common axis of motion on the peripheral line of said cylinder and one of said jaws having an independent axis of motion, means for actuating the folding-blade, and means for actuating the gripping-jaws.

31. In a folding-machine, the combination of a folding-blade, a folding-cylinder, a pair of gripping-jaws, an axis about which said jaws may turn together, a crank-arm attached to said axis, a suitably-shaped cam adapted to coact with said crank-arm to turn said jaws together independently of and during the rotation of said cylinder.

32. In a folding-machine, the combination of a folding-blade, a folding-cylinder, a pair of gripping-jaws mounted upon a common axis, one of said jaws having an independent axis of motion, a crank-arm and a cam for causing said grippers to turn together about their common axis, a crank-arm and cam attached to the axis of the separately-pivoted jaw, and a cam for coöperating with said crank-arm to cause said jaw to turn independently of its fellow.

33. In a folding-machine, the combination with a folding-blade, a folding-cylinder, a pair of gripping-jaws having a common axis of motion, means for turning said grippers about said axis, a separate axis upon which one of said jaws is mounted for independent movement, spring mechanism for keeping said jaws normally together, and means for turning said separately-mounted jaw about its axis of motion and against the tension of said spring mechanism for the purpose of opening or separating said jaws.

34. The combination of a folding-blade, a folding-cylinder, a pair of gripping-jaws having a common axis of motion, a crank-arm attached to said axis and coöperating with a suitable cam, a separate axis upon which one of said jaws is pivotally mounted, a crank-arm on said separate axis, spring mechanism acting normally to cause said crank-arms to approach each other and then to keep said jaws in closed condition, a third crank-arm attached to the said separate axis, and a cam for coacting therewith to cause an independent vibration of said separately-pivoted jaw and to hold it away from the relatively-fixed jaw until such time as it may be desired to have the spring mechanism restore the said jaws to their closed condition and to maintain them thus while carrying the folded portion of the sheet.

35. In a folding-machine, the combination of a folding-blade, a folding-cylinder, a gripping-jaw having its axis of motion in bearings on said cylinder, a second gripping-jaw having a separate axis of motion mounted in bearings attached to the first-mentioned gripping-jaw, and means for turning both jaws together about the first-mentioned axis of motion and for turning the second-mentioned jaw independently about its own axis.

36. In a folding-machine, the combination of a folding-blade, a folding-cylinder, a gripping-jaw having an axis mounted in bearings in said cylinder and provided with eyes or bearings, a second gripping-jaw having a shaft or axis mounted in said eyes or bearings, and means for turning said jaws together and for turning the second-mentioned jaw independently about its own axis.

37. In a folding-machine, the combination of a folding-blade, a folding-cylinder, a gripping-jaw provided at its ends with journals which are mounted in bearings in said cylinder, a crank-arm attached to one of said journals, a cam for actuating the same, a second gripping-jaw having a shaft or journals mounted in bearings on the first gripping-jaw, a crank-arm on one end of the shaft of the second-mentioned gripping-jaw, spring mechanism connecting the said two crank-arms and acting to cause both said gripper-jaws to remain closed, a crank-arm on the opposite end of said last-mentioned shaft, and a cam for acting upon the same and causing the jaws to open against the tension of the spring mechanism.

38. In a folding-machine, the combination of a folding-blade, a folding-cylinder having a longitudinal groove, end plates on said cylinder having journal-bearings and curved slots, a gripping-jaw 12 having end journals adapted to said bearings, a crank-arm 14 attached to one of said journals, a cam for acting on said arm, a second gripping-jaw 13 having a shaft or axis mounted in bearings formed on the jaw 12, a crank-arm 20 on one end of said shaft or axis, a connecting-rod extending from said crank-arm 20 to an extension of said crank-arm 14, a spring acting on said rod and against an abutment on said extension and tending to keep the said jaws closed, a crank-arm 23 also on said shaft or axis of the gripper 13, and a cam for coacting therewith.

39. In a folding-machine, the combination of a folding-cylinder having a longitudinal groove, end plates provided with journal-bearings and curved slots, a gripping-jaw 12 having journals 9, arms 10, bearings 10ᵃ and crank 14, and a gripping-jaw 13 having a shaft 11 provided at one end with a crank-arm 20 and at the opposite end with a crank-arm 23, the crank-arms 14 and 20 being connected together by a spring mechanism, substantially as described, and suitable cams for coacting with the crank-arms 14 and 23.

40. In a folding-machine, the combination of a folding-cylinder having a groove and end plates, journal-bearings and curved slots, the gripping-jaw 12 having a horizontal working face and a curved back and having tubular bearings 10ᵃ and end journals, and a companion gripping-jaw 13 comprising a curved body, a horizontal working face, and bearing-eyes, a shaft fixed in the said eyes and mounted to turn in the bearings 10ª, and means for turning both jaws together about the journals of the jaw 12 and also for turning the jaw 13 about the shaft or axis 11.

41. In a folding-machine, the combination with a folding-cylinder, of a pair of gripping-jaws adapted to open and close and mounted to turn together independently of the cylinder so as to carry the folded portion of the sheet from a substantially radial to a substantially tangential position, and means for turning the said jaws in a reverse direction during the completion of the rotation of the cylinder so as to restore said jaws to their normal positions and enable them to receive the fold of another sheet on their arrival at the place at which the fold is to be made.

42. In a folding-machine, the combination of a folding-cylinder, a pair of gripping-jaws adapted to move together independently of the cylinder during its rotation and one of said jaws having a capacity for independent movement, means for turning the jaws backwardly during the first part of the advancing movement of the cylinder and means for turning the jaws forwardly after the delivery of the folded sheet and thereby causing the said jaws to be restored to normal position before the fold-receiving locality is reached.

43. In a folding-machine, the combination of a folding-cylinder, a pair of gripping-jaws adapted to turn together backwardly relatively to the forward motion of the cylinder during about the first quarter of its revolution and adapted also to turn together in the reverse direction during the remainder of the revolution of said cylinder.

44. In a folding-machine, the combination of a folding-cylinder, a pair of gripping-jaws having a common axis of motion on said cylinder and one of said jaws having a separate axis of motion, means for turning said jaws backwardly during about the first quarter of a revolution of said cylinder, means for turning said jaws together about their common axis in a forward direction during the remainder of the revolution of the cylinder, and means for opening and closing said jaws at the proper times to receive and clamp and carry and release the folded portion of the sheet.

45. In a folding-machine, the combination of a folding-cylinder, a pair of gripping-jaws, means for turning said jaws together so that their mouth comes substantially radial of the cylinder at the time the fold is made, means for progressively turning said jaws so that their mouth comes to a position substantially tangential to said cylinder, means for then opening said jaws, and means for again moving said jaws together so that their mouth is progressively restored again to a position substantially radial of said cylinder.

46. In a folding-machine, the combination of a folding-cylinder, a pair of gripping-jaws, means for turning said jaws together independently of said cylinder and for opening and closing said jaws whereby the fold may be made in a direction substantially radial of the cylinder and released in a position substantially tangential to the cylinder, and a suitable delivery mechanism for taking the folded edge of the sheet substantially at a tangent to said cylinder.

47. In a folding-machine, the combination of a cylinder, a folding-blade pivotally mounted in the periphery thereof, means for turning said blade so that it projects substantially horizontally of the cylinder at the time the fold is being made, means for turning said blade out of said horizontal position and toward a tangent position during the first part of the rotation of the blade-cylinder, means for restoring the folding-blade to a horizontal position before the blade next comes around to folding position, a folding-cylinder, and a pair of gripping-jaws thereon adapted to take the fold of the sheet in a substantially radial direction and float the same in substantially horizontal planes until the fold of the sheet arrives at a substantially tangential position relatively to the surface of said folding-cylinder.

48. In a folding-machine, the combination of a folding-cylinder, a pair of gripping-jaws adapted to take the fold of a sheet in a substantially radial direction, means for floating said jaws to a substantially tangential position during the first part of the revolution of said cylinder, means for opening said jaws and releasing the folded sheet, means for restoring said jaws to their normal position during the remainder of the revolution of the cylinder, a folding-blade cylinder, a folding-blade mounted therein so as to project substantially radially when crossing the line joining the axes of said cylinders during the time the fold is being made, means for floating said folding-blade out of its radial position during the time it is being retreated from the folding-jaws, and means for restoring said folding-blade to its operating position.

Signed in the borough of Manhattan, in the city of New York, in the county of New York and State of New York, this 1st day of February, A. D. 1899.

RALPH C. SEYMOUR.

Witnesses:
E. M. WELLS,
K. V. DONOVAN.